United States Patent
Taha et al.

[11] Patent Number: 5,928,105
[45] Date of Patent: Jul. 27, 1999

[54] PLANET CARRIER ASSEMBLY WITH STATIONARY WASHER MEMBERS

[75] Inventors: Issam A. Taha, Clinton; Patrick Michael Gibson, Ypsilanti; John William Kimes, Wayne; James Alan Springer, Ann Arbor, all of Mich.

[73] Assignee: General Motors Corporation, Detroit, Mich.

[21] Appl. No.: 09/105,404

[22] Filed: Jun. 26, 1998

[51] Int. Cl.⁶ .................................................. F16H 57/04
[52] U.S. Cl. ............................................ 475/331; 475/346
[58] Field of Search .................................. 475/159, 331, 475/346, 347, 348

[56] References Cited

U.S. PATENT DOCUMENTS

| | | | |
|---|---|---|---|
| 3,667,324 | 6/1972 | Laing | 475/348 X |
| 4,104,933 | 8/1978 | Campbell | 475/348 X |
| 4,776,237 | 10/1988 | Premiski et al. | 74/750 R |
| 4,885,959 | 12/1989 | Shinjo et al. | 475/347 X |
| 4,901,601 | 2/1990 | Leggat | 475/348 |
| 5,292,292 | 3/1994 | Heinrich et al. | 475/346 X |
| 5,302,160 | 4/1994 | Fujioka | 475/348 |
| 5,470,286 | 11/1995 | Fan | 475/331 |
| 5,480,362 | 1/1996 | Tananaka et al. | 475/346 X |
| 5,795,258 | 8/1998 | Faass et al. | 475/348 |

*Primary Examiner*—Khoi Q. Ta
*Attorney, Agent, or Firm*—Donald F. Scherer; Dean L. Ellis

[57] ABSTRACT

A planet carrier assembly has a plurality of pinion gears rotatably mounted in a cage or spider. A stationary washer, having four bearing pads, is disposed adjacent the sidewall of the planet carrier cage. Th& sidewalls are spaced and have aligned openings to accept pinion pins on each of which a pinion gear is rotatably mounted. A rotatable washer, or thrust bearing, is disposed between each pinion gear and respective bearing pads of the stationary washers.

10 Claims, 4 Drawing Sheets

5,928,105

PLANET CARRIER ASSEMBLY WITH STATIONARY WASHER MEMBERS

TECHNICAL FIELD

This invention relates to planet carrier assemblies, and more particularly, to bearing structures for planet carrier assemblies.

BACKGROUND OF THE INVENTION

Planet carrier assemblies have a cage or spider in which a plurality of pinion gears are rotatably mounted. One or more thrust bearings are positioned between each gear and the inner sidewall surface of the cage to accommodate relative rotation between the pinion gears and the cage. These washers also absorb thrust forces imposed on the pinion gears.

When two thrust washers are positioned on each side of each gear, the washer adjacent the cage is usually held stationary relative to the cage and the washer adjacent the gear is permitted to rotate. When a single thrust washer is used on each side of each gear, the cage sidewall, as well as the gear sidewall, must be machined to accommodate rotation of the washer relative thereto. When two adjacent are used, the assembler has the task of ensuring each pinion gear has a total of four washers. If four pinions are mounted in the cage, the assembler must account for sixteen washers. If a single washer is omitted, at least one pinion of the planet carrier must be disassembled so that the washer can be installed. Since the pins are swaged at assembly, a new pin is required when the pinion is reassembled.

When a single washer is installed on each side of each pinion gear, the cost of additional machining increases the cost of the carrier assembly. Each cage sidewall must be inspected to ensure that the machining has been accomplished prior to assembly of the cage. When two washers are used on each side of each pinion, the stationary washer must have a tab or other structure which will prevent rotation between the cage and the stationary washer.

SUMMARY OF THE INVENTION

It is an object of the present invention to provide an improved stationary washer for planet carrier assembly.

In one aspect of the present invention, a one piece washer is disposed adjacent the sidewall of the planet cage to provide a washer for each pinion gear in the planet carrier assembly.

In another aspect of the present invention, the one piece washer has a web portion which is trapped between the sidewall and spacer portion of the cage.

In one embodiment, the cage of the carrier assembly is provided with a one piece stationary washer on each interface of each sidewall of the cage. The stationary washers have web portions interconnecting bearing portions. The web portions are trapped between one sidewall and connecting posts or ribs on the cage. The posts secure the two sidewalls of the cage together to form the cage.

In another embodiment, one stationary washer has a cylindrical portion which is secured by a press fit and a bore formed in one sidewall of the cage. Both embodiments ensure that the stationary washers will be in place when the pinion gears and rotatable washers are installed. The implementation of the one piece stationary washer reduces the likelihood of error at assembly and the number of parts that the assembler must manipulate during installation of the pinion gears.

DESCRIPTION OF THE PREFERRED EMBODIMENT

Figure 1:
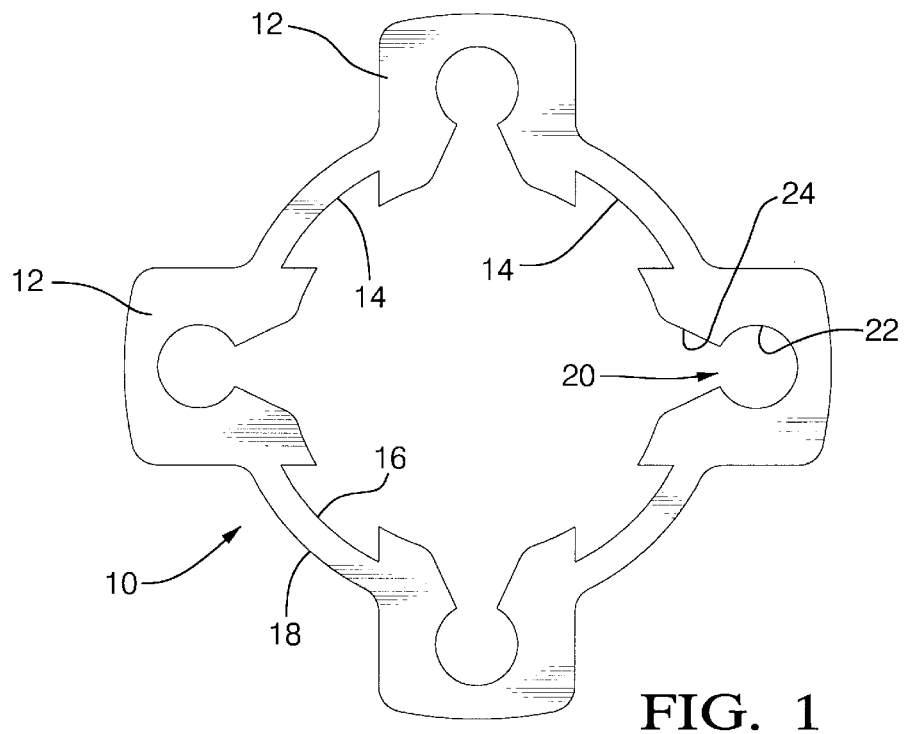
FIG. 1 is a plan view of one embodiment of the stationary washer.

Referring to the drawings, wherein like characters represent the same or corresponding parts throughout the several views, there is seen in FIG. 1, a stationary washer 10 having four spaced bearing pads 12, which are interconnected by web members 14. Each web member 14 has an inside diameter 16 and an outside diameter 18. Each bearing pad has formed therein a key slot and pin opening 20 which is comprised of a substantially circular opening 22 and a tapered or truncated opening 24.

Figure 2:
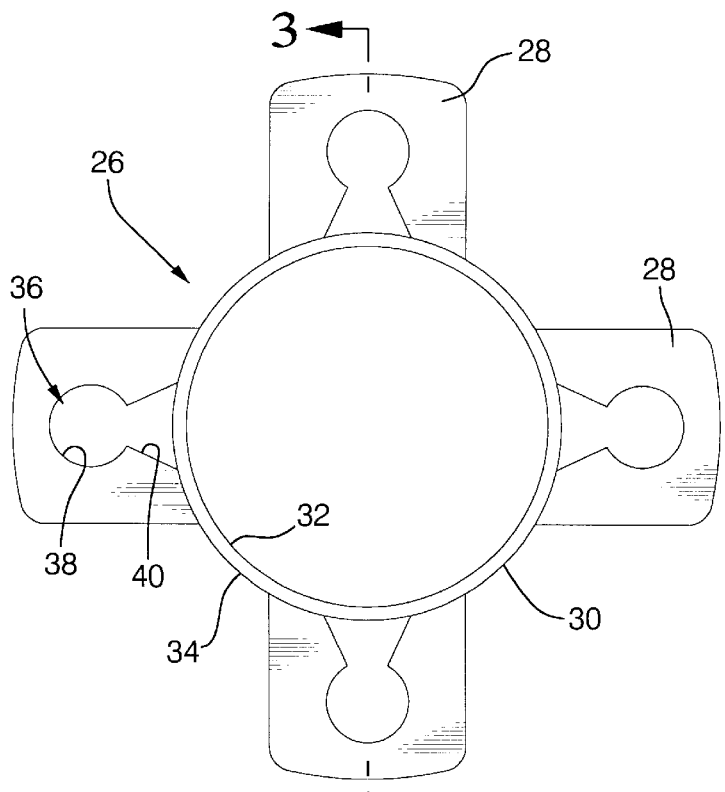
FIG. 2 is a plan view of another embodiment of the stationary washer.
Figure 3:
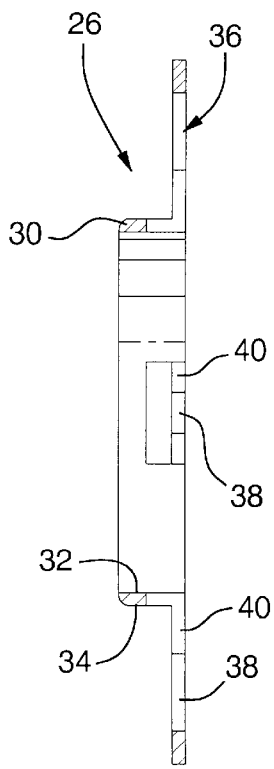
FIG. 3 is a view taken along line 3—3 of FIG. 2.

A stationary washer 26 is shown in FIGS. 2 and 3. This washer 26 includes a plurality of bearing pads 28 interconnected by a cylindrical web 30. The cylindrical web 30 has an inside diameter 32 and an outside diameter 34. Each bearing pad has a key slot and pin opening 36 comprised of a substantially circular opening 38 and a truncated opening 40.

The key slot and pin openings 20 and 36 are substantially identical with the exception of the cylindrical portion of stationary washer 26. The cylindrical opening 38 accommodates a pinion pin while the truncated openings 24 and 40 accommodate lubrication flow into the area of the pinion pin as will be seen in other drawings.

Figure 4:
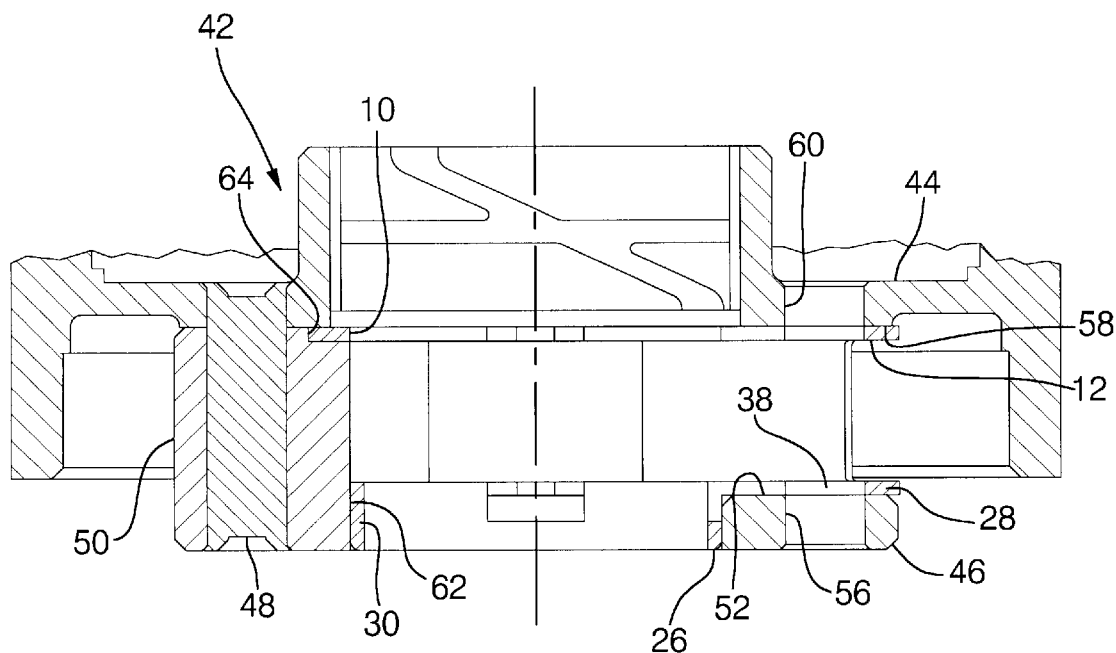
FIG. 4 is an elevational view in cross section of a cage assembly incorporating the stationary washers.
Figure 5:
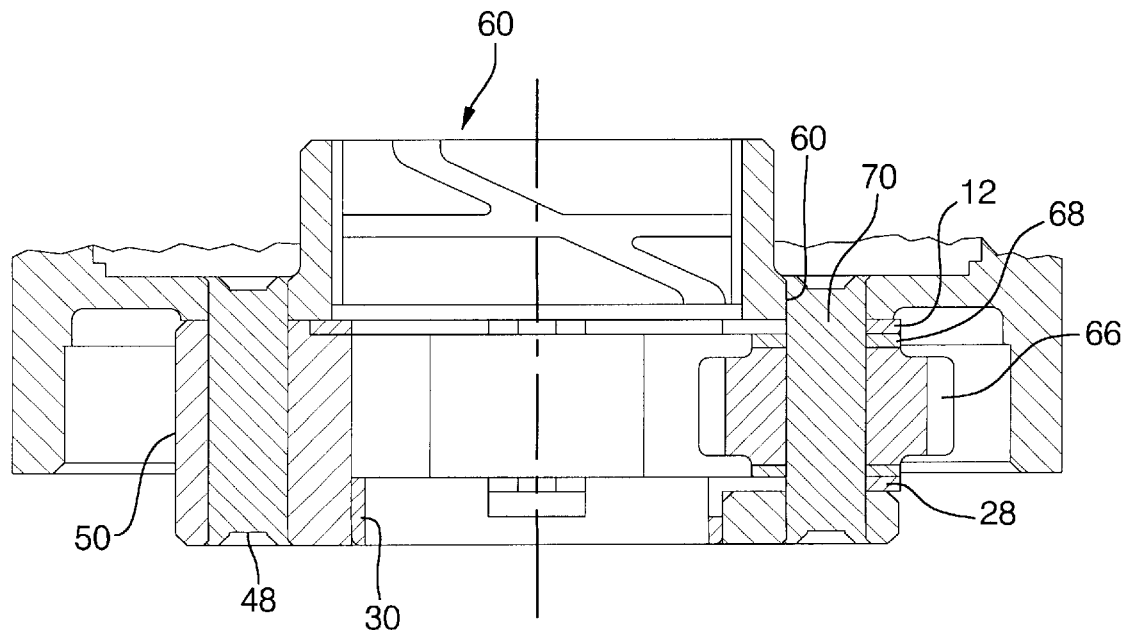
FIG. 5 is an elevational view in cross section of a planet carrier assembly, utilizing the cage shown in FIG. 4.

Referring to FIGS. 4 and 5, there is seen a planet cage or spider assembly 42 which incorporates the stationary washer 10 and the stationary washer 26. The planet cage 42 includes a first sidewall member 44 and a second sidewall member 46 which are secured together by a plurality of pins or fasteners 48. The sidewall 46 has integrally formed therewith a plurality of posts or spacers 50 through which the pins 48 pass. The sidewall 46 also has an inner face or wall 52 and a plurality of pin openings 56.

The sidewall 44 also has an inner face or wall 58 and a plurality of pin openings 60. The sidewall 46 supports the stationary washer 26 with the cylindrical web 30 pressfit into an inner diameter 62. As can be seen in FIG. 4, the cylindrical opening 38 is aligned with the pin opening 56. The stationary washer 10 is supported in a recess rim portion 64 formed in the sidewall 46 in each post 50. The stationary washer 10 is secured in position when the sidewall 44 is secured to the sidewall 46. Each of the stationary washers 10 and 26 are supported on the respective walls 58 and 52.

As seen in FIG. 5, a planet carrier assembly 54 has three or more pinion gears 66 disposed between the bearing pads 12 and 28 of the stationary washers 10 and 26, respectively. Also disposed between the bearing pads is a pair of thrust washers or bearings 68 with one disposed on each side of each pinion gear 66. At assembly, the assembler inserts each pinion gear 66 then the two thrust washers 68 into the assembly between the bearing pads 12 and 28 and a pinion pin 70 is installed and swaged into place. With the swaging of the pinion pin 70, the carrier assembly is completed and the stationary washer is disposed to provide thrust support for the pinion gears.

Figure 6:
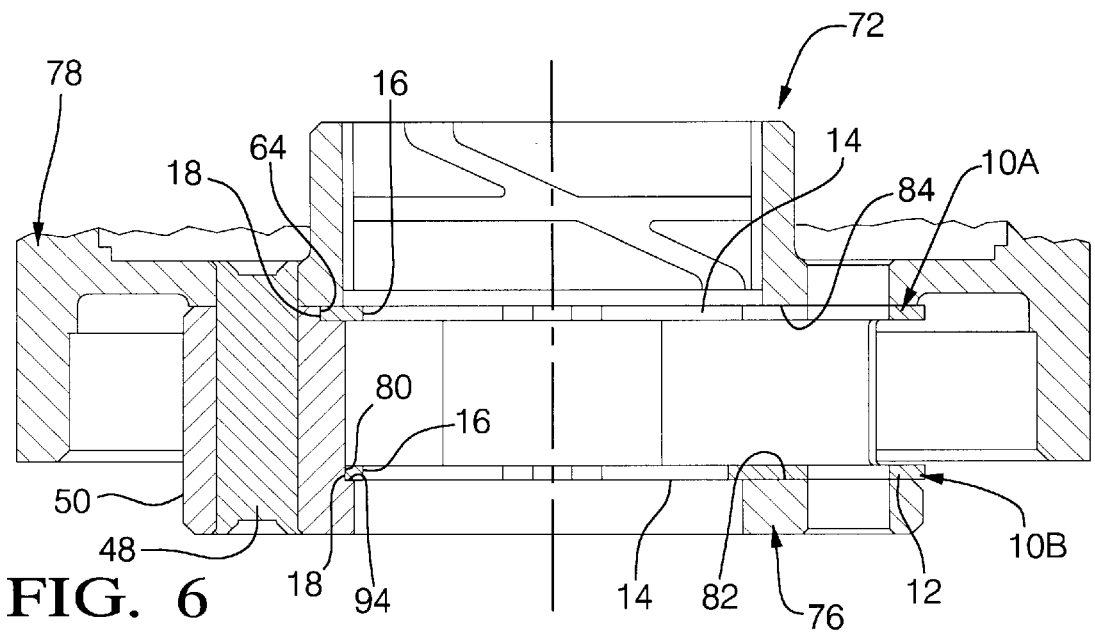
FIG. 6 is a view similar to FIG. 4, wherein the cage has two stationary washers similar to the embodiment shown in FIG. 1.

A planet cage assembly 72 is shown in FIG. 6. This cage assembly 72, when equipped with pinion gears, is shown as a planet carrier assembly 74 in FIG. 7. The cage 72 includes a pair of sidewalls 76 and 78 which are secured together by a plurality of fasteners 48. The sidewall 76 has a pair of rim recesses 80 and 64 formed therein. Rim recess 80 has a smaller diameter than the rim recess 64.

Figure 7:
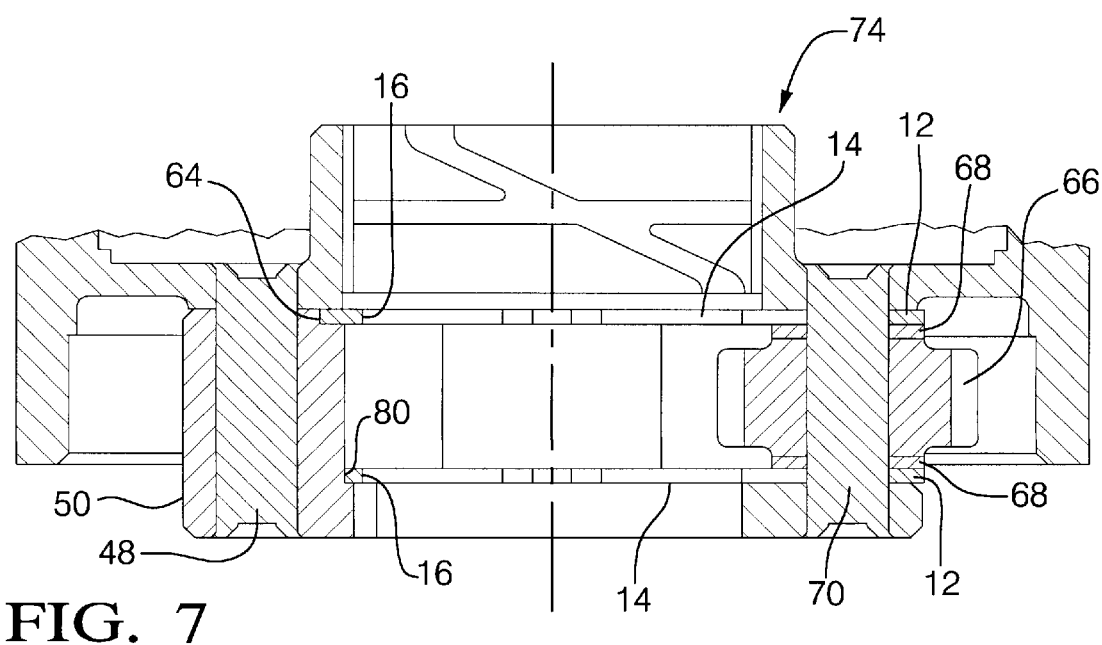
FIG. 7 is a view similar to FIG. 5 utilizing the cage assembly shown in FIG. 6.

The stationary washer 10 is supported on an inner face 82 of the sidewall 76 and the stationary washer 10 is supported on an inner face 84 of the sidewall 78. As seen in FIG. 7, a plurality of pinions, such as pinion gear 66, are disposed between the stationary washers 10 as well as a pair of rotatable thrust bearings 68. The major differentiating point of the stationary washers 26 and 10 is the cylindrical portion or web 30 of the stationary washer 26.

The embodiment shown in FIGS. 6 and 7 of the stationary washer as assembled in the carrier assembly, utilizes two stationary washers similar to those shown in FIG. 1. The major difference being that the stationary washer 10 disposed in the sidewall 76 has a smaller outer diameter 18 that the outer diameter 18 of stationary washer 10 disposed between the sidewall 78 and sidewall 76. The inner diameter 16 of both stationary washers 10 are identical. The use of the two flat stationary washers as shown in FIGS. 6 and 7 permits a simpler assembly process to be utilized.

In the carrier assembly shown 74 in FIG. 6, the stationary washer 26 is pressfit to the diameter 62 of the sidewall 46 while the stationary washer 10 is held in place with a light adhesive prior to assembly of the two sidewalls. In the cage assembly 72, shown in FIG. 6, the stationary washers 10 are held in position by a light adhesive applied to the web 14 of each stationary washer to hold the stationary washers in place until the assembly of the sidewall 78 to 76 is completed and until the assembly of the pinion gears 66 into the planet carrier assembly 74.

Figure 8:
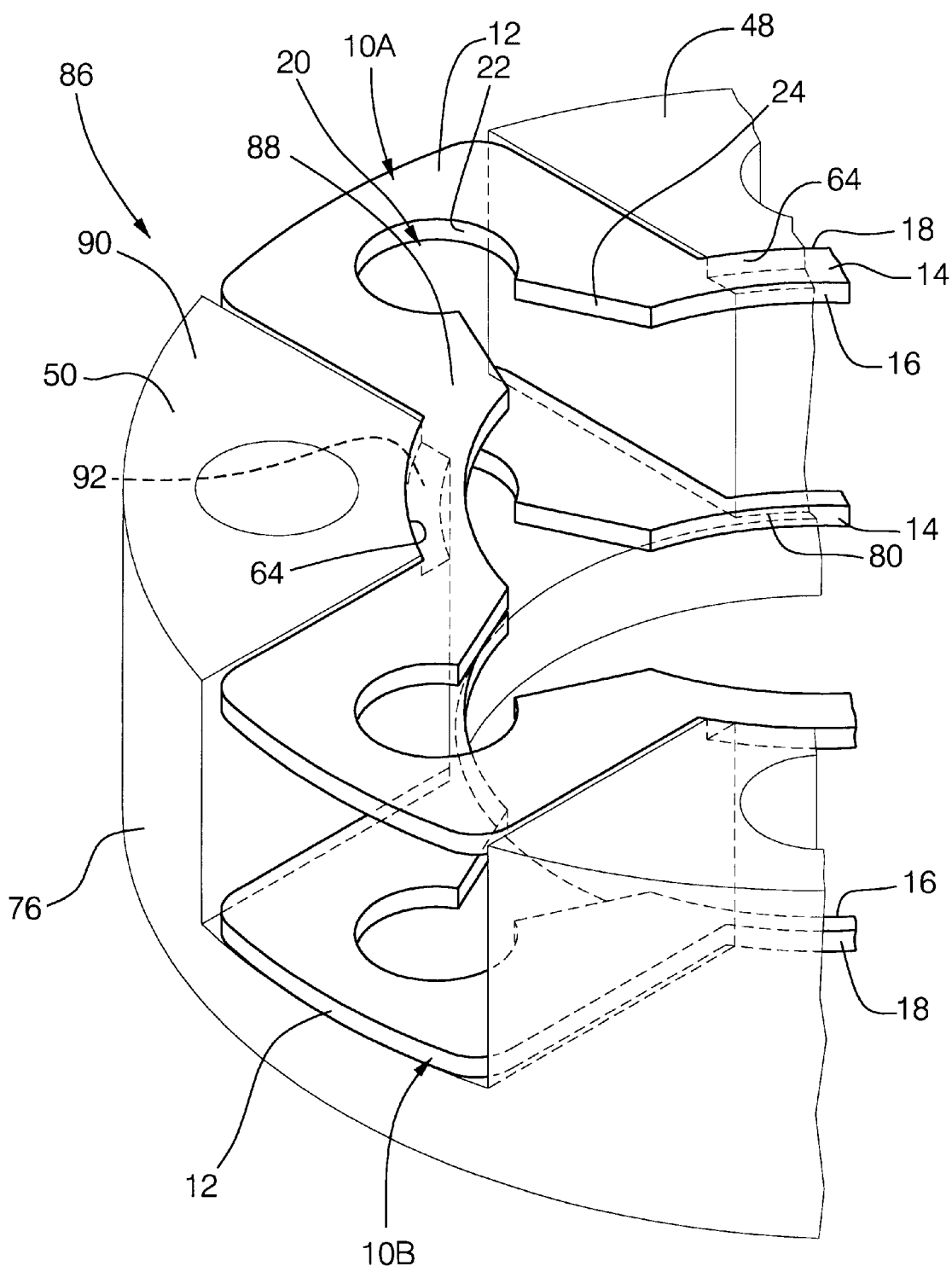
FIG. 8 is a perspective view of a portion of a cage having two stationary washers similar to the embodiment shown in FIG. 1.

The perspective view of a partial cage assembly 86 is shown in FIG. 8. As can be seen in FIG. 8, the stationary washer. 10A is supported in the rim recess 64 formed in the post 50 of sidewall 76 The rim recess 64 is formed such that an upper surface 88 of the stationary washer 10A is substantially flush with an upper surface 90 of the post 50. The stationary washer 10A rests on a shelf 92 of the rim recess 64. Prior to assembly, an adhesive can be applied either to the shelf 92 or to the stationary washer 10A.

The stationary washer 10B rests on an annular shelf or wall formed as shown at 94 in FIGS. 6 and 7. Prior to assembly, an adhesive can be applied to either the surface 94 or the stationary washer 10B to hold the washer in place prior to assembly of the two sidewalls 76 and 78. It should also be noted in FIG. 8 that the bearing pads 12 of the stationary washers 10A and 10B are disposed between the posts 48 of the sidewall 76. If desired, the stationary washer 10B can also have adhesive applied to the bearing pad portion 12 prior to assembly to ensure securement to the sidewall 76 prior to its assembly with sidewall 78.

The stationary washers 10 are shown in a single component. That is, the webs are continuous bearing pad portions 12. However, if desired, a tab and slot structure can be utilized in manner quite similar to that known in the assembly of friction pads for clutch and brake discs. In such an assembly, each web portion would have a tab and a slot formed on the opposite sides of the bearing pad area. These tab and slot structures of adjacent web portions would then be assembled so that adjacent bearing pads would be secured together by the continuous web 14. The stationary washer 10 can be stamped and assembled in a single process, such that it is only necessary for the assembler to handle a single piece. As mentioned above, this art of manufacture and assembly of a flat unitary piece from a plurality of stamped pieces is well known in the art of the making of such flat surfaces such as friction pads.

Those skilled in the art will recognize that the unitary stationary washer members greatly reduce the number of parts utilized at assembly and also reduce the likelihood that a part will be omitted. The stationary washers provide the assembler with a much larger component to handle and require only that the single piece be placed in the proper location. Therefore, it is believed that the present invention will improve the assembly process and reduce the likelihood of a washer being omitted.

We claim:

1. A planet carrier assembly comprising:
   a first sidewall member;
   a second sidewall member spaced from said first sidewall member;
   posts and fasteners securing said sidewall members together;
   a first stationary washer member, disposed adjacent said first sidewall member, including a plurality of bearing portions each having a pinion pin opening formed therein aligned with respective openings in said first sidewall member;
   a second stationary washer member, disposed adjacent said second sidewall member, including a plurality of bearing portions each having a pinion pin opening aligned with respective ones of said openings in said first sidewall member and also with openings in said second sidewall member; and
   a plurality of pinion gears disposed between said first and second stationary washer members and each pinion gear being rotatably mounted on respective pinion pins secured in respective ones of said openings in said first and second sidewall members and each said pinion gear being axially aligned with respective ones of said bearing portions.

2. The planet carrier assembly defined in claim 1 further comprising;
   said posts being integral with said first sidewall member and being secured with said second sidewall member, each post including a rim recess for supporting web portions of said second stationary washer adjacent thereto, said bearing portions being interconnected by said web portions and being disposed between respective adjacent posts.

3. The planet carrier assembly defined in claim 1 further comprising:
   said posts being integral with said first sidewall member and being substantially equiangularly spaced thereon, web portions interconnecting adjacent bearing portions of said stationary washers said first sidewall member further including a rim portion formed at respective intersections of said posts and said first sidewall member for supporting said web portions of said first stationary washer adjacent thereto.

4. The planet carrier assembly defined in claim 3 further comprising:

a rim recess formed on each post supporting respective web portions of said second stationary washer adjacent thereto, said bearing portions being disposed between respective adjacent posts.

5. A planet carrier assembly comprising:

a first sidewall member having a cylindrical inner wall;

a second sidewall member spaced from said first sidewall member;

posts securing said sidewalls together;

a first stationary washer member, disposed adjacent said first sidewall member, including a plurality of bearing portions interconnected by a cylindrical web portion each bearing portion having a pinion pin opening formed therein aligned with respective openings in said first sidewall member, said cylindrical portion being disposed in said cylindrical inner wall to hold said first stationary washer in position during assembly to said first sidewall;

a second stationary washer member, disposed adjacent said second sidewall member, including a plurality of bearing portions interconnected by web portions each bearing portion having a pinion pin opening aligned with respective ones of said openings in said first sidewall member and also with openings in said second sidewall; and a plurality of pinion gears disposed a space between said first and second stationary washer members and each pinion gear being rotatably mounted on respective pinion pins secured in respective ones of said openings in said first and second sidewall members and being axially aligned with said bearing portions.

6. A planet carrier assembly comprising:

a first sidewall member;

a second sidewall member spaced from said first sidewall member;

angularly spaced posts securing said sidewalls together;

a first stationary washer member, disposed adjacent said first sidewall member, including a plurality of bearing portions interconnected by web portions each bearing portion having a pinion pin opening formed therein aligned with respective openings in said first sidewall member, said bearing portions being disposed between adjacent posts;

a second stationary washer member, disposed adjacent said second sidewall member, including a plurality of bearing portions interconnected by web portions each bearing portion having a pinion pin opening aligned with respective ones of said openings in said first sidewall member and also with openings in said second sidewall member, said bearing portions being disposed between adjacent posts; and a plurality of pinion gears disposed in a space between respective first and second stationary washer members and each pinion gear being rotatably mounted on respective pinion pins secured in respective ones of said openings in said first and second sidewall members and each said pinion gear being axially aligned with respective ones of said bearing portions.

7. The planet carrier assembly defined in claim 6 further comprising;

said posts being integral with said first sidewall member and being secured with said second sidewall member, each post including a rim recess for supporting respective ones of said web portions of said second stationary washer adjacent thereto.

8. The planet carrier assembly defined in claim 6 further comprising:

said posts being integral with said first sidewall member and being substantially equiangularly spaced thereon, said first sidewall further including a rim portion formed at respective intersections of said posts and said first sidewall member for supporting said web portions of said first stationary washer adjacent thereto.

9. The planet carrier assembly defined in claim 8 further comprising:

a rim recess formed on each post supporting respective web portions of said second stationary washer.

10. The planet carrier assembly defined in claim 6 further comprising;

said web portions of said first stationary washer comprising a cylindrical body and said first sidewall member having a cylindrical inner surface for accepting said cylindrical body.

* * * * *